United States Patent
Horie et al.

(10) Patent No.: US 10,152,144 B2
(45) Date of Patent: Dec. 11, 2018

(54) POSITION POINTER AND POSITION INDICATOR CARTRIDGE

(71) Applicant: Wacom Co., Ltd., Saitama (JP)

(72) Inventors: Toshihiko Horie, Saitama (JP); Ryoji Kamiyama, Ibaraki (JP); Shigeru Yamashita, Saitama (JP)

(73) Assignee: Wacom Co., LTD., Saitama (JP)

( * ) Notice: Subject to any disclaimer, the term of this patent is extended or adjusted under 35 U.S.C. 154(b) by 30 days.

(21) Appl. No.: 15/378,008

(22) Filed: Dec. 13, 2016

(65) Prior Publication Data

US 2017/0090605 A1 Mar. 30, 2017

Related U.S. Application Data

(63) Continuation of application No. PCT/JP2015/065346, filed on May 28, 2015.

(30) Foreign Application Priority Data

Aug. 29, 2014 (JP) .................................. 2014-176083

(51) Int. Cl.
*G06F 3/0354* (2013.01)
*G06F 3/046* (2006.01)
(Continued)

(52) U.S. Cl.
CPC ........ *G06F 3/03545* (2013.01); *G06F 3/0383* (2013.01); *G06F 3/046* (2013.01); *G06F 3/0416* (2013.01); *G06F 2203/04105* (2013.01)

(58) Field of Classification Search
None
See application file for complete search history.

(56) References Cited

U.S. PATENT DOCUMENTS 5,576,502 A 11/1996 Fukushima et al.
5,736,980 A 4/1998 Iguchi et al.
(Continued)

FOREIGN PATENT DOCUMENTS

JP H06-37924 U 5/1994
JP 3121560 U 4/2006
(Continued)

OTHER PUBLICATIONS

Japanese Office Action dated Sep. 30, 2015 from JP 2015-542065 (5 pages).
(Continued)

*Primary Examiner* — Kenneth B Lee, Jr.
(74) *Attorney, Agent, or Firm* — Seed IP Law Group LLP

(57) ABSTRACT

A position indicator includes a tubular chassis in which an opening is made on one end in an axial direction as a pen tip side and another end. A position indicator cartridge is housed in a hollow part of the chassis. The position indicator cartridge includes a core body unit having a coil that forms part of a resonant circuit that is wound partly around a bar-shaped magnetic core, part of the magnetic core around which the coil is not wound forming a pen tip part, and a tubular body unit that houses at least a capacitor that forms part of the resonant circuit. A change circuit also forms part of the resonant circuit and is configured to change a resonant frequency or a phase of the resonant circuit according to a writing pressure applied to the core body unit.

21 Claims, 8 Drawing Sheets

(51) Int. Cl.
*G06F 3/038* (2013.01)
*G06F 3/041* (2006.01)

(56) References Cited

U.S. PATENT DOCUMENTS

| | | |
|---|---|---|
| 2013/0269446 A1 | 10/2013 | Fukushima et al. |
| 2014/0085270 A1* | 3/2014 | Obata ............... G06F 3/046 |
| | | 345/179 |
| 2016/0162053 A1 | 6/2016 | Obata |

FOREIGN PATENT DOCUMENTS

| | | |
|---|---|---|
| JP | 2009-86925 A | 4/2009 |
| JP | 2011-186803 A | 9/2011 |
| JP | 2013-161307 A | 8/2013 |
| JP | 2013-222268 A | 10/2013 |
| JP | 2014-021674 A | 2/2014 |
| JP | 2014-67265 A | 4/2014 |

OTHER PUBLICATIONS

International Search Report dated Apr. 17, 2015 from PCT/JP2015/065346 (2 pages).

* cited by examiner

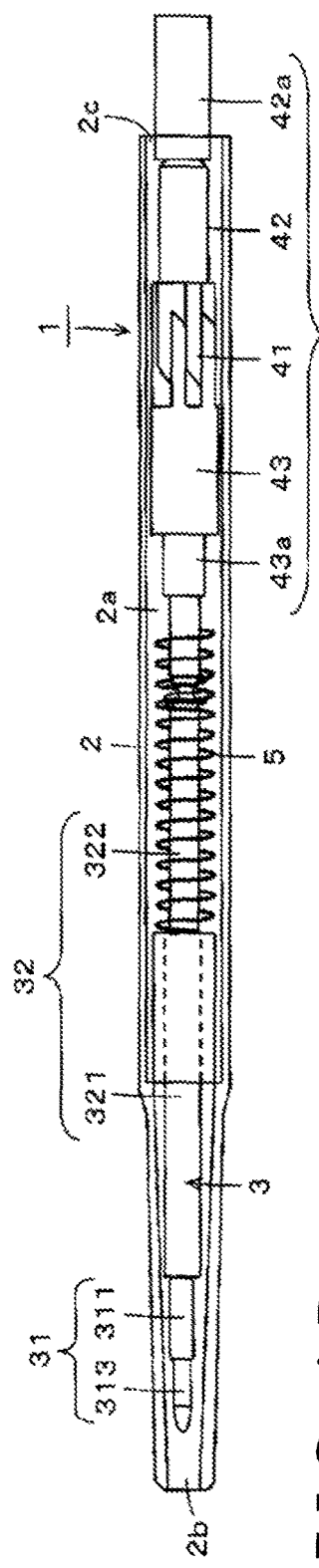
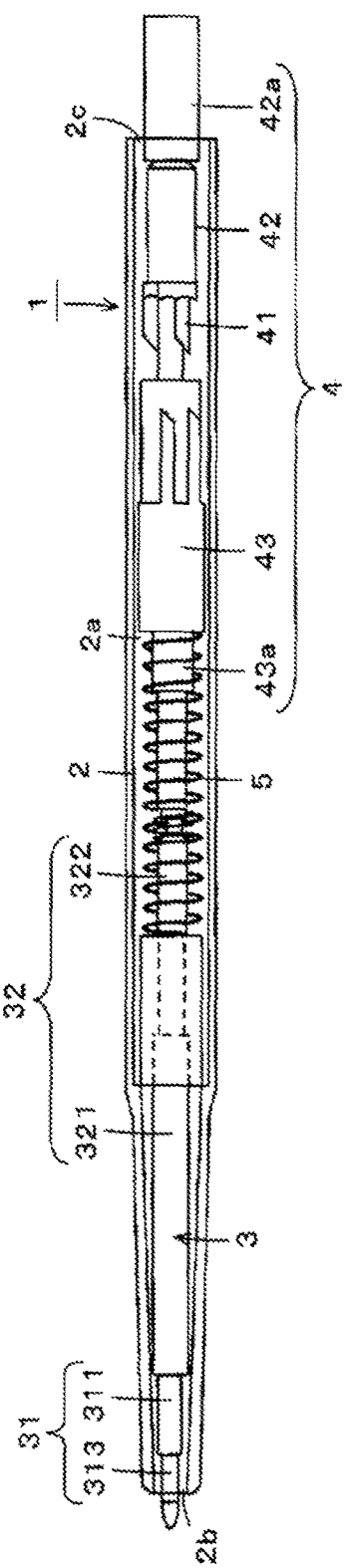
FIG. 1A
FIG. 1B

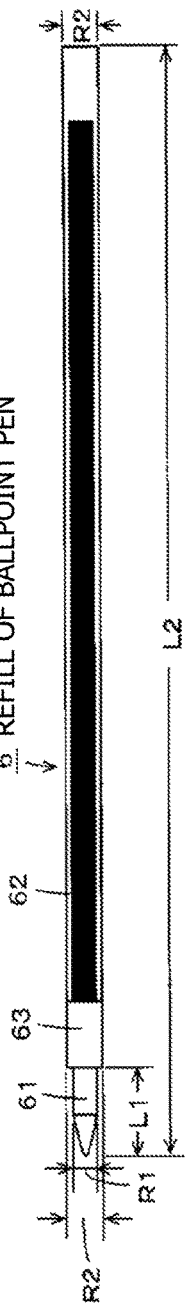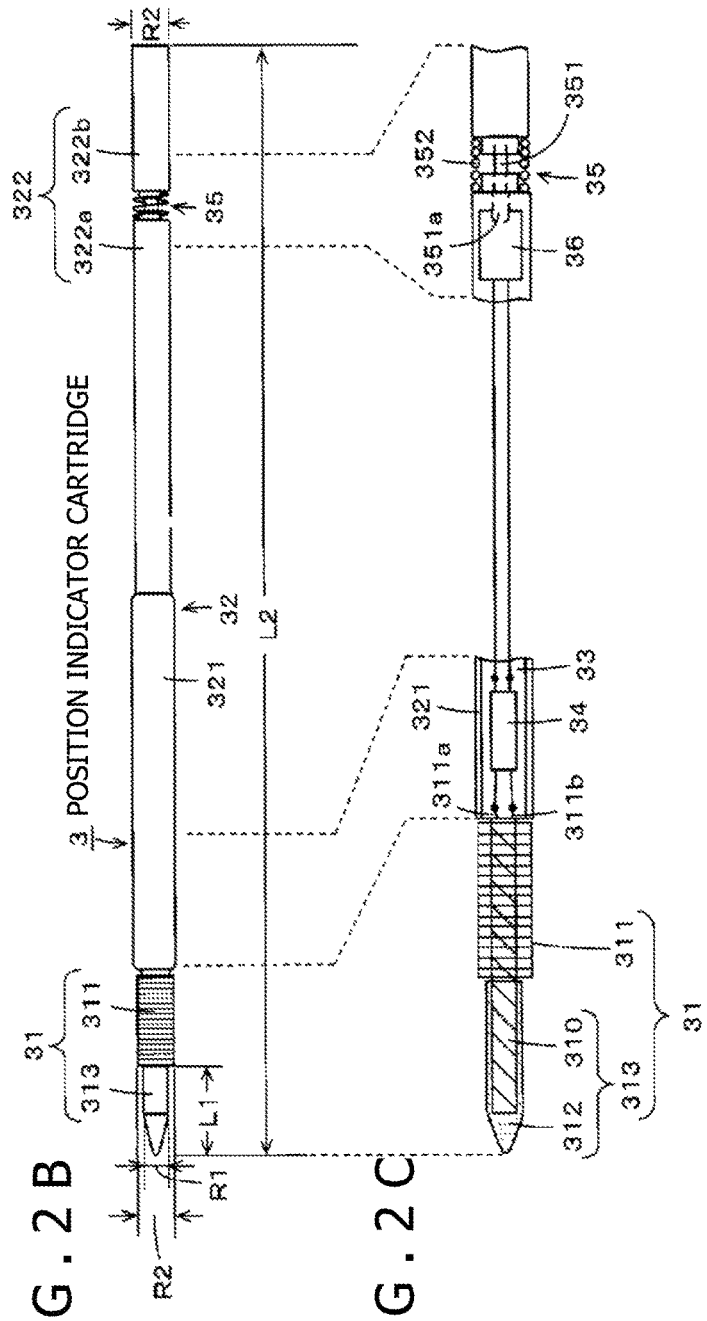

POSITION POINTER AND POSITION INDICATOR CARTRIDGE

BACKGROUND

Technical Field

The present disclosure relates to a position indicator that is used with a position detecting device and is suitable as e.g. an electromagnetic induction system, and a position indicator cartridge.

Description of the Related Art

A coordinate input device of an electromagnetic induction system is composed of a position detecting device including a sensor made by disposing a large number of loop coils in the X-axis direction and the Y-axis direction of coordinate axes and a pen-shaped position indicator having a resonant circuit composed of a coil that is wound around a magnetic core and is as an example of an inductor and a capacitor.

Furthermore, the position detecting device supplies a transmission signal with a predetermined frequency to the loop coil of the sensor and transmits the transmission signal to the position indicator as electromagnetic energy. The resonant circuit of the position indicator is configured to have a resonant frequency according to the frequency of the transmission signal and stores the electromagnetic energy based on an electromagnetic induction effect between the resonant circuit and the loop coil of the sensor. Then, the position indicator returns the electromagnetic energy stored in the resonant circuit to the loop coil of the sensor of the position detecting device.

The loop coil of the sensor detects the electromagnetic energy from this position indicator. The position detecting device detects the coordinate values of the X-axis direction and the Y-axis direction over the sensor, indicated by the position indicator, on the basis of the position of the loop coil that supplied the transmission signal and the position of the loop coil that detected the electromagnetic energy from the resonant circuit of the position indicator.

In FIG. 8, one example of a schematic configuration of a conventional pen-shaped position indicator 100 is shown. The position indicator 100 of the example of FIG. 8 is a position indicator described in Patent Document 1 (Japanese Patent Laid-Open No. 2009-86925).

A case (chassis) 101 of the position indicator 100 has a bottomed circular cylindrical shape formed of a first case 102 and a second case 103 that are assembled and joined in an axis center or axial direction. On one end side of the first case in the axial direction, an opening 102a for externally protruding the side of one end 109a of a bar-shaped core body 109 in which the side of the one end 109a serves as the pen tip is formed. In the hollow part of the case 101, a coil 104, a writing pressure detector 105, and a printed board 107 on which electronic components such as a capacitor 106 that forms a resonant circuit with the coil 104 are mounted are sequentially lined up in the axial direction and are housed.

The coil 104 is wound around a ferrite core 108 as an example of a circular cylindrical magnetic core having a through-hole 108a along the axial direction. The core body 109 is formed as a component that is not mechanistically joined to the ferrite core 108 and is provided to penetrate through the through-hole 108a of this ferrite core 108. Furthermore, the writing pressure detector 105 is housed on the side of the ferrite core 108 opposite to the opening 102a of the first case 102 and the other end 109b of the core body 109 is fitted to the writing pressure detector 105. The core body 109 is moved and displaced in the axial direction according to the applied writing pressure. The writing pressure detector 105 detects the movement and displacement caused in the core body 109 as the writing pressure. The writing pressure detector 105 in this example is configured to detect the writing pressure as change in capacitance.

The writing pressure detector 105 is electrically connected to electronic components such as a capacitor on the printed board 107 by a terminal 105a and a terminal 105b and is electrically connected to one end and the other end of the coil 104. The writing pressure detector 105 forms a resonant circuit by the coil and a predetermined capacitor even when pressure is not being applied to the core body 109. When pressure (writing pressure) is applied to the core body 109, the capacitor capacitance changes in the writing pressure detector 105 and the resonant frequency changes. The position indicator 100 gives and receives electromagnetic waves to and from a position detecting device by this resonant circuit. The position detecting device detects a position indicated by the core body 109 of the position indicator 100 as the coordinate position at which the position detecting device is giving and receiving electromagnetic waves to and from the position indicator 100.

As described above, in the conventional position indicator of the electromagnetic induction system, by disposing the core body 109 through the through-hole 108a along the axial direction in the ferrite core 108, the configuration is made in which the pressure applied to the core body 109 is transmitted to the writing pressure detector 105 and the contact of the position indicator 100 to the input surface of the position detecting device can be detected.

Incidentally, due to preference for size reduction in recent years, demands for size reduction have been becoming stronger also in portable electronic equipment. Furthermore, the pen-shaped position indicator has come to be used with a position detecting device for this kind of small electronic equipment and a position indicator having a thinner shape is required.

However, in the case of the conventional position indicator of the above-described Patent Document 1, thickness reduction is difficult due to the configuration in which the bar-shaped core body 109 is inserted in the through-hole 108a along the axial direction in the ferrite core 108. Specifically, even in the case of this position indicator with the configuration of Patent Document 1, thickness reduction is possible if a high-accuracy through-hole in which the core body can be inserted can be formed in a thin ferrite. However, the ferrite is hard and it is difficult to form the through-hole with precise dimensional accuracy. In addition, there is a problem that the wall thickness of the ferrite core 108 becomes thin due to the formation of the through-hole and the ferrite becomes susceptible to breakages. Therefore, in the position indicator with the structure of Patent Document 1, thickness reduction is difficult substantially.

To solve this problem, a position indicator in which a protruding member serving as the pen tip is allowed to be provided without making a through-hole in a ferrite core is described in Patent Document 2 (Japanese Patent Laid-Open No. 2014-21674) for example.

FIG. 9A is a diagram depicting a configuration example of a position indicator 200 described in the Patent Document 2. Furthermore, FIG. 9B and FIG. 9C are diagrams for explaining the pen tip part of the position indicator 200 of this example.

As depicted in FIG. 9A, a case (chassis) 201 of the position indicator 200 of this example is composed of a resin or the like for example and is elongated in the axial direction. The case 201 internally has a hollow part whose cross-section is a circular shape, and is formed into a bottomed circular cylindrical shape whose one side is closed.

Furthermore, in the present embodiment, in the hollow part of the case 201, a ferrite core 203 as one example of a magnetic core around which a coil 202 as an example of an inductor is wound, a pressure sensing component (writing pressure detection component) 204, and a printed board 205 are held by a holder 206 composed of a resin for example and are housed.

One end side of the case 201 in the axial direction is deemed as the pen tip side of the position indicator 200 with a pen shape. On this pen tip side, the case 201 has an opening 201a formed of a through-hole for allowing a protruding member (pen tip member) 207 of a core body to protrude to the outside. In this case, the hollow part of the case 201 has a diameter larger than a diameter of the through-hole of the opening 201a, and a step part 201b is formed at the part of the opening 201a in the inner wall surface forming the hollow part.

A pedestal member 208 is disposed on a side of the opening 201a in the hollow part of the case 201. The pedestal member 208 has a thin circular column shape with such a diameter that the pedestal member 208 engages with the step part 201b and does not pass through the opening 201a (see FIGS. 9B and 9C). The ferrite core 203 has a thin circular column shape and is joined to the protruding member 207 to form the core body. Furthermore, the pedestal member 208 is bonded to one end surface of the ferrite core 203 by an adhesive and is fixedly provided. Moreover, the protruding member 207 is fitted to the pedestal member 208 and the ferrite core 203 insertably and removably through the opening 201a, which is a through-hole.

As depicted in FIGS. 9B and 9C, the protruding member 207 is obtained by monolithically forming a pen-tip main body part 2071 and a fitting protrusion 2072 by a single material. As depicted in FIGS. 9B and 9C, the pen-tip main body part 2071 is composed of a base part 2071a having a circular column shape with a diameter slightly smaller than the diameter of the opening 201a and a tip part 2071b having a spindle shape whose diameter gradually becomes smaller from the circular columnar base part 2071a toward the tip.

As depicted in FIGS. 9B and 9C, the fitting protrusion 2072 is formed at the central part of an end surface 2073 of the base part 2071a of the pen-tip main body part 2071 on the side opposite to the side of the tip part 2071b. As depicted in FIGS. 9B and 9C, the fitting protrusion 2072 has a quadrangular column shape as a whole and has a shape in which each of four corner parts formed by four side surfaces of the quadrangular column is cut into a rectangular shape in the direction toward the central axis.

Furthermore, the fitting protrusion 2072 is formed to gradually become thinner toward its tip side as depicted in FIGS. 9B and 9C. Moreover, the length of this fitting protrusion 2072 in the axial direction is selected to be larger than the thickness of the pedestal member 208.

The pedestal member 208 is composed of a material having a higher hardness than the protruding member 207 composed of a polyoxymethylene (POM) resin or an acrylonitrile butadiene styrene (ABS) resin, specifically, e.g., polycarbonate. Furthermore, the diameter of a through-hole 208a of the pedestal member 208 is set to a diameter that allows press-in fitting of the fitting protrusion 2072 of the protruding member 207.

Therefore, when the fitting protrusion 2072 of the protruding member 207 is inserted in the through-hole 208a of the pedestal member 208 as depicted in FIG. 9C, the fitting protrusion 2072 of the protruding member 207, whose hardness is lower than the pedestal member 208, is partly deformed. This causes the protruding member 207 to be fitted to the pedestal member 208 as depicted in FIG. 9C and become in a state of being held by the pedestal member 208 by being pressed-in, e.g., press-fitted. Thereby, the protruding member 207 is firmly fixed to the pedestal member 208.

Furthermore, on the side opposite to the opening 201a, the holder 206 includes a component disposing part 206b formed continuously with a locking part 206a and further includes a printed board placement part 206c formed continuously with the component disposing part 206b. Furthermore, the pressure sensing component 204 is held by the component disposing part 206b. Moreover, the printed board 205 is held by the printed board placement part 206c of the holder 206.

The pressure sensing component 204 is formed by sequentially lining up a ferrite chip 2041, a coil spring 2042, and an elastic body, specifically silicone rubber 2043 in this example, in the axial direction. Furthermore, in the component disposing part 206b, the pressure sensing component 204 is held in the state in which, by the coil spring 2042, one end surface of the ferrite chip 2041 forms a predetermined air gap Ar with the silicone rubber 2043 mounted on the end surface of a flange part 203a of the ferrite core 203.

Furthermore, when a pressing force (writing pressure) is applied to the protruding member 207 forming the pen tip by a user of the position indicator 200, the ferrite core 203 is biased and comes closer to the side of the ferrite chip 2041 against the biasing force of the coil spring 2042 according to the pressing force. Along with this, the inductance of the coil 202 changes in response to this, and the phase of radio waves transmitted from the coil 202 of the resonant circuit (resonant frequency) changes.

PRIOR ART DOCUMENTS PATENT DOCUMENTS

Patent Document 1: Japanese Patent Laid-Open No. 2009-86925
Patent Document 2: Japanese Patent Laid-Open No. 2014-21674

BRIEF SUMMARY

Technical Problems

According to the position indicator of the above-described Patent Document 2, a through-hole does not need to be made in the ferrite core and correspondingly the ferrite core can be set thinner, which enables thickness reduction of the position indicator. However, in Patent Document 2, the configuration in which the pedestal member is bonded to the ferrite core is employed, and a predetermined area is necessary for the tip end surface of the ferrite core in order to ensure the bonding. For this reason, there is a limit to the thickness reduction of the ferrite core and there is also a limit to the thickness reduction of the position indicator itself.

Furthermore, in the case of Patent Document 2, because of the configuration in which the protruding member is mounted to the tip of the ferrite core with the intermediary of the pedestal member, the position of the ferrite core is separate from the pen tip by a distance corresponding to the protruding member mounted with the intermediary of the pedestal member. For this reason, the distance between the sensor of the position detecting device and the ferrite core becomes large and there is a fear that electromagnetic coupling between the position indicator and the sensor becomes weak correspondingly.

The present disclosure intends to solve the above-described problems and provide a position indicator that allows further thickness reduction.

Technical Solution

In order to solve the above-described problems, the present application discloses a position indicator having a tubular chassis in which an opening is made on one end in an axial direction as a pen tip side and another end is closed. At least one position indicator cartridge is housed in the tubular chassis. Each position indicator cartridge includes: a core body unit including a coil that is wound partly around a bar-shaped magnetic core, part of the magnetic core around which the coil is not wound forming a pen tip part, and a tubular body unit that houses at least a capacitor that forms a resonant circuit with the coil. The core body unit and the tubular body unit are joined and fixed in the axial direction on a side opposite to the pen tip part of the core body unit in a state in which the coil and the pen tip part of the core body unit are exposed and in a state in which the coil and the capacitor are electrically connected. The tubular body unit is divided into a pen tip side and a side opposite to the pen tip side in the axial direction, and the pen tip side and the side opposite to the pen tip side in the divided tubular body unit are joined to each other in a state in which they are elastically displaceable in the axial direction. A change circuit is configured to change a resonant frequency or a phase of the resonant circuit according to a writing pressure applied to the core body unit is provided in one of the pen tip side and the side opposite to the pen tip side in the tubular body unit. The changing element forming part of the resonant circuit.

The position indicator of the present disclosure is configured by housing the position indicator cartridge having the novel configuration in the tubular chassis in which the opening is made on the one end in the axial direction as the pen tip side and the other end is closed.

This position indicator cartridge is configured as a cartridge in which the core body unit and the tubular body unit are integrally joined. In addition, the core body unit is a unit in which the pen tip part is formed in such a manner that at least the part around which the coil is not wound in the magnetic core around which the coil is wound is covered by the protective material. There is no need to open a through-hole in the magnetic core and insert a core body therein or to join a protruding member serving as the pen tip part to an end part of the magnetic core as in the conventional configurations. Thus, the magnetic core can be easily set thin. Therefore, thickness reduction of the core body unit is easy.

Furthermore, by reducing also the thickness of the tubular body unit forming the position indicator cartridge, thickness reduction of the whole of the position indicator cartridge is enabled and thickness reduction of the position indicator can be realized. This enables the position indicator cartridge to have a configuration that allows ensuring of the compatibility with a refill of a commercially-available ballpoint pen.

There is a fear that the magnetic core becomes susceptible to breakages when being set thin. However, in the present disclosure, the magnetic core on the pen tip side is covered by the protective material to be reinforced and thus can be made less susceptible to breakages.

Furthermore, in the position indicator of the present disclosure, the core body unit is formed by covering the magnetic core itself with the protective material. Thus, the distance between the magnetic core and the sensor of the position detecting device can be shortened and the electromagnetic coupling between both can be made stronger.

Moreover, because of the configuration in which the position indicator cartridge is housed in the chassis, the position indicator of the present disclosure may have a configuration similar to that of a ballpoint pen whose ink core can be replaced. In particular, by setting the dimensions of the position indicator cartridge to the same dimensions as the refill of the ballpoint pen, the position indicator of the present disclosure can be used as a ballpoint pen by housing the refill of a ballpoint pen in the chassis of the position indicator. In other words, the position indicator cartridge of the position indicator of the present disclosure can be housed in the chassis of a commercially-available ballpoint pen, and there is also a merit that the position indicator can be configured by using the chassis of this commercially-available ballpoint pen.

Advantageous Effects

According to the position indicator in accordance with the present disclosure, because of the configuration in which the position indicator cartridge having the core body unit in which the pen tip part is formed by the protective material formed to cover the magnetic core is housed in the chassis, the magnetic core can be easily set thin and thickness reduction of the position indicator itself is also enabled.

Furthermore, in the present disclosure, the magnetic core on the pen tip side of the position indicator cartridge is covered by the protective material to be reinforced and thus can be made less susceptible to breakages.

Moreover, in the position indicator of the present disclosure, the pen tip part of the core body unit is formed by covering the magnetic core itself with the protective material. Thus, the distance between the magnetic core and the sensor of the position detecting device can be shortened and the electromagnetic coupling between both can be made stronger.

BRIEF DESCRIPTION OF THE DRAWINGS

FIGS. 1A and 1B are diagrams depicting a configuration example of a first embodiment of a position indicator according to the present disclosure.

FIGS. 2A-2C are diagrams for explaining a configuration example of an embodiment of a position indicator cartridge according to the present disclosure.

DETAILED DESCRIPTION

Figure 3:
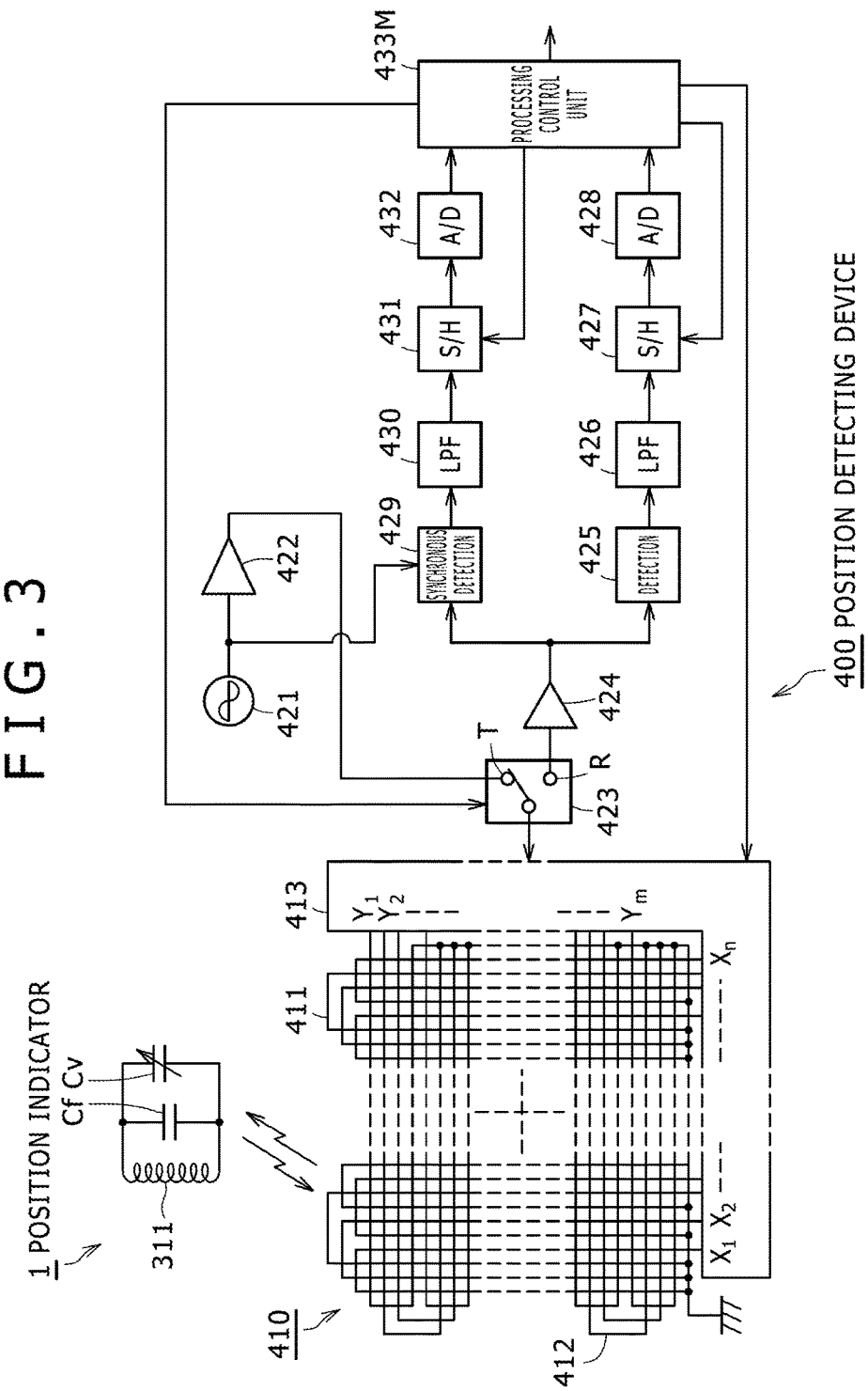
FIG. 3 is a diagram depicting a circuit configuration of the first embodiment of the position indicator according to the present disclosure with a circuit configuration of a position detecting device used with this position indicator.

Embodiments of the position indicator according to the present disclosure will be described below with reference to the drawings.

[First Embodiment]

FIGS. 1A and 1B are diagrams depicting a configuration example of a first embodiment of a position indicator according to the present disclosure. A position indicator 1 of the first embodiment has a knock-type configuration in which a position indicator cartridge 3 is housed in a hollow part 2a of a tubular chassis 2 and a pen tip of the position indicator cartridge 3 protrudes and retracts from a side of an opening 2b at one end of the chassis 2 in a longitudinal direction by a knock cam mechanism unit 4.

FIG. 1A depicts a state in which the whole of the position indicator cartridge 3 is housed in the hollow part 2a of the chassis 2. FIG. 1B depicts a state in which the pen tip side of the position indicator cartridge 3 protrudes from the opening 2b of the chassis 2 by way of the knock cam mechanism unit 4. The example of FIGS. 1A and 1B is depicted in a state in which the chassis 2 of the position indicator 1 is composed of a transparent synthetic resin and the inside thereof is see-through.

The position indicator 1 of the present embodiment is configured to ensure compatibility with a commercially-available knock-type ballpoint pen.

The chassis 2 and the knock cam mechanism unit 4 provided in this chassis 2 have the same configuration as a well-known commercially-available knock-type ballpoint pen and the dimensional relationship is also configured identically. In other words, it is also possible to use the chassis and the knock cam mechanism unit of the commercially-available knock-type ballpoint pen as they are as the chassis 2 and the knock cam mechanism unit 4.

As depicted in FIGS. 1A and 1B, the knock cam mechanism unit 4 has a well-known configuration in which a cam main body 41, a knock bar 42, and a rotary element 43 are combined. The cam main body 41 is formed on the inner wall surface of the tubular chassis 2. An end part 42a of the knock bar 42 is made to protrude from an opening 2c on the side opposite to the pen tip side of the chassis 2 so that knock operation by a user can be accepted. The rotary element 43 has a fitting part 43a to which the end part of the position indicator cartridge 3 on the side opposite to the pen tip side is fitted.

When the end part 42a of the knock bar 42 is pressed down in the state shown in FIG. 1A, the position indicator cartridge 3 is locked into the state of FIG. 1B in the chassis 2 by the knock cam mechanism unit 4, which provides the state in which the pen tip side of the position indicator cartridge 3 protrudes from the opening 2b of the chassis 2. Then, when the end part 42a of the knock bar 42 is pressed down again from this state shown in FIG. 1B, the locked state is released by the knock cam mechanism unit 4 and the position of the position indicator cartridge 3 in the chassis 2 returns to the state shown in FIG. 1A by a return spring 5. The detailed configuration of the knock cam mechanism unit 4 and the operation thereof are well known and therefore description thereof is omitted here.

[Embodiment of Position Indicator Cartridge]

FIGS. 2A-2C are diagrams depicting a configuration example of the position indicator cartridge 3 with a comparison to a refill of a commercially-available knock-type ballpoint pen. Specifically, FIG. 2A depicts a refill 6 of the commercially-available knock-type ballpoint pen and FIG. 2B depicts a configuration example of the position indicator cartridge 3 of the present embodiment. Furthermore, FIG. 2C is a diagram for explaining the configuration of the major parts of the position indicator cartridge 3 of the present embodiment depicted in FIG. 2B.

As depicted in FIG. 2A, the refill 6 of the commercially-available knock-type ballpoint pen has a well-known configuration in which a pen tip part 61 in which a ball is disposed at the tip and an ink container or ink storage 62 are joined at a joint part 63 and are integrated. The joint part 63 has the same diameter as the ink storage 62.

On the other hand, the position indicator cartridge 3 of the present embodiment has a configuration in which a core body unit 31 and a tubular body unit 32 are joined to be integrated as depicted in FIG. 2B. As depicted in FIG. 2C, the core body unit 31 has a configuration in which a coil 311 is wound partly around a magnetic core, specifically a ferrite core 310 in this example, and a part thereof around which the coil 311 is not wound is covered by a protective material 312 to form a pen tip part 313.

In this example, in the core body unit 31, the coil 311 is wound around a part with approximately a half length of the total length of the ferrite core 310 from the vicinity of one end part of the ferrite core 310. Furthermore, the part with the remaining approximately-half length, around which the coil 311 is not wound, in the ferrite core 310 is covered by the protective material 312 composed of, e.g., a resin and is used as the pen tip part 313. As the protective material 312 of the pen tip part 313, a resin material that is comparatively hard and has elasticity, specifically, e.g., polyoxymethylene (POM), is used.

As a method for making a configuration to cover the ferrite core 310 by the protective material 312, e.g., a method of repeating a step of immersing the part desired to be covered by the protective material 312 in the ferrite core 310 in a resin material that is melted and is to become the protective material 312 and drawing up the immersed part, or the like, can be used.

In this case, as depicted in FIG. 2A and FIG. 2B, the configuration is so made that the diameter and length of the pen tip part 313 of the core body unit 31 of the position indicator cartridge 3 are substantially equal to a diameter R1 and a length L1 of the pen tip part 61 of the refill 6 of the ballpoint pen. Furthermore, the configuration is so made that the diameter of the part around which the coil 311 is wound in the core body unit 31 of the position indicator cartridge 3 is substantially equal to a diameter R2 (R2>R1) of the ink storage 62 of the refill 6 of the ballpoint pen.

Furthermore, the tubular body unit 32 is composed of a first tubular body unit 321 in which electronic circuit components are disposed and a second tubular body unit 322 in which components for writing pressure detection are disposed. Moreover, as depicted in FIGS. 2A and 2B, the length (total length) in the state in which the core body unit 31 and the tubular body unit 32 are joined is selected to be equal to a total length L2 of the refill 6 of the ballpoint pen.

A printed board 33 is disposed in the first tubular body unit 321 of the tubular body unit 32 as depicted in FIG. 2C. In addition, a circuit component 34 including a capacitor that forms a resonant circuit with the coil 311 is provided on the printed board 33.

Furthermore, the core body unit 31 and the first tubular body unit 321 of the tubular body unit 32 are joined to be integrally configured in a state in which part of the ferrite core 310 of the core body unit 31 is inserted in the first tubular body unit 321, for example. In this case, in the joining between the core body unit 31 and the first tubular body unit 321 of the tubular body unit 32, a winding start end 311a and a winding finish end 311b of the coil 311 are electrically connected to one end and another end of the capacitor in the first tubular body unit 321, respectively.

The diameter of the tubular body unit 32 is also set substantially the same as the diameter R2 of the ink storage 62 of the refill 6 of the ballpoint pen. However, in the example of FIG. 2B, the diameter of the first tubular body unit 321 is set slightly larger than the above-described diameter R2. However, when the position indicator cartridge 3 is housed in the chassis of the ballpoint pen, the part of the first tubular body unit 321 is located at a part where there is room between the inner wall surface of the chassis and the refill 6 in the hollow part of the tubular chassis. Therefore, no problem exists although such a diameter is set.

In this example, the second tubular body unit 322 is formed of a tubular body with a diameter equal to the diameter R2 of the ink storage 62 of the refill 6 of the commercially-available ballpoint pen. In the example of FIGS. 2A-C, the second tubular body unit 322 is divided into two parts including a longer part 322a and a shorter part 322b, and a writing pressure detector 36 is provided near a joint part 35 of them in this example.

Specifically, as depicted in FIG. 2C, the longer part 322a and the shorter part 322b are joined at the joint part 35 with the intermediary of a linking bar member 351 and a coil spring 352 in this example. In this case, by the coil spring 352, the longer part 322a and the shorter part 322b are always elastically displaced to be separated from each other in an axial center direction. However, the longer part 322a and the shorter part 322b are configured to be locked at predetermined positions by the linking bar member 351 so as not to be displaced in the axial center direction beyond the positions. Furthermore, the configuration is so made that the total length of the position indicator cartridge 3 in the locked state is equal to the total length L2 of the refill 6 of the above-described ballpoint pen.

Moreover, as depicted in FIG. 2C, the writing pressure detector 36 is provided in the longer part 322a in the present embodiment. Furthermore, the configuration is so made that the side of one end 351a of the linking bar member 351 works as a pressing part of the writing pressure detector 36.

The writing pressure detector 36 of this example can employ a configuration of a variable-capacitance capacitor that uses writing pressure detecting means with a well-known configuration described in Patent Document: Japanese Patent Laid-Open No. 2011-186803, for example, and whose capacitance changes according to the writing pressure. It is also possible to employ a configuration using a semiconductor element that allows the capacitance to vary according to the writing pressure like one disclosed in Japanese Patent Laid-Open No. 2013-161307, for example.

When pressure is applied to the core body unit 31 in the state in which the position indicator cartridge 3 is housed in the chassis 2, a force that causes the whole of the side of the longer part 322a of the position indicator cartridge 3 to move to the side of the shorter part 322b works against the elastic force of the coil spring 352, and the capacitance of the writing pressure detector 36 becomes a capacitance according to the writing pressure.

The position indicator cartridge 3 with the above-described configuration is housed in the chassis 2 by fitting the shorter part 322b of the tubular body unit 32 of the position indicator cartridge 3 to the fitting part 43a of the rotary element 43 of the knock cam mechanism unit 4. Furthermore, in the position indicator 1 of the present embodiment, when using the position indicator 1 with a position detecting device, the user presses down the end part 42a of the knock bar 42 to cause the tip of the pen tip part 313 of the core body unit 31 to protrude from the opening 2b of the chassis 2 as depicted in FIG. 1B. Then, when use of the position indicator 1 ends, the user presses down the end part 42a of the knock bar 42 again to cause the whole of the position indicator cartridge 3 to be housed in the hollow part 2a of the chassis 2 as depicted in FIG. 1A and protect the core body unit 31.

In the example of FIGS. 2A-2C, the coil 311 is wound around the approximately-half length part of the ferrite core 310. However, the length of the part around which the coil 311 is wound in the ferrite core 310 is not limited thereto and is arbitrary. Furthermore, in the case of ensuring compatibility with a refill of a commercially-available ballpoint pen, the length of the pen tip part 313 of the core body unit 31 is not limited to the above-described length L1 and it suffices that the length is equal to or longer than the length L1.

Moreover, in the example of FIGS. 2A-2C, in the second tubular body unit 322, the side opposite to the pen tip side is employed as the shorter part 322b in the above-described example. However, this side opposite to the pen tip side may be employed as the longer part, or the second tubular body unit 322 may be bisected into parts with the same length.

[Circuit Configuration for Position Detection and Writing Pressure Detection in Position Detecting Device Used with Position Indicator 1]

Next, with reference to FIG. 3, a description will be made about a circuit configuration example of a position detecting device 400 that carries out detection of a position indicated by the position indicator 1 of the above-described embodiment and detection of a writing pressure applied to the position indicator 1 and the operation of the position detecting device 400.

As depicted in FIG. 3, the position indicator 1 includes a resonant circuit in which the coil 311 as an inductor, a variable-capacitance capacitor Cv formed of the writing pressure detector 36, and a resonance capacitor Cf housed in the tubular body unit 32 are connected in parallel.

On the other hand, in the position detecting device 400, an X-axis direction loop coil group 411 and a Y-axis direction loop coil group 412 are stacked and a position detecting coil 410 is formed. The respective loop coil groups 411 and 412 are composed of n and m, respectively, rectangular loop coils for example. The respective loop coils configuring the respective loop coil groups 411 and 412 are disposed to be lined up at equal intervals and sequentially overlap with each other.

Furthermore, in the position detecting device 400, a selection circuit 413 to which the X-axis direction loop coil group 411 and the Y-axis direction loop coil group 412 are connected is provided. The selection circuit 413 sequentially selects one loop coil in the two loop coil groups 411 and 412.

Moreover, the position detecting device 400 is provided with an oscillator 421, a current driver 422, a switching connecting circuit 423, a receiving amplifier 424, a detector 425, a low-pass filter 426, a sample/hold circuit 427, an analog to digital (A/D) conversion circuit 428, a synchronous detector 429, a low-pass filter 430, a sample/hold circuit 431, an A/D conversion circuit 432, and a processing control unit 433. The processing control unit 433 is formed of a microcomputer.

The oscillator 421 generates an alternating current (AC) signal with a frequency f0. Furthermore, the oscillator 421 supplies the generated AC signal to the current driver 422 and the synchronous detector 429. The current driver 422 converts the AC signal supplied from the oscillator 421 to a current and sends out the current to the switching connecting circuit 423. Due to control from the processing control unit 433, the switching connecting circuit 423 switches the connection target (transmitting-side terminal T and receiving-side terminal R) to which the loop coil selected by the selection circuit 413 is connected. In these connection targets, the transmitting-side terminal T and the receiving-side terminal R are connected to the current driver 422 and the receiving amplifier 424, respectively.

An induced voltage generated in the loop coil selected by the selection circuit 413 is sent to the receiving amplifier 424 via the selection circuit 413 and the switching connecting circuit 423. The receiving amplifier 424 amplifies the induced voltage supplied from the loop coil and sends out the amplified voltage to the detector 425 and the synchronous detector 429.

The detector 425 detects the induced voltage generated in the loop coil, i.e., the received signal, and sends out the received signal to the low-pass filter 426. The low-pass filter 426 has a cutoff frequency sufficiently lower than the above-described frequency f0 and converts the output signal of the detector 425 to a direct current (DC) signal and sends out the DC signal to the sample/hold circuit 427. The sample/hold circuit 427 holds a voltage value at a predetermined timing of the output signal of the low-pass filter 426, specifically at a predetermined timing in a reception period, and sends out the voltage value to the analog to digital (A/D) conversion circuit 428. The A/D conversion circuit 428 converts the analog output of the sample/hold circuit 427 to a digital signal and outputs the digital signal to the processing control unit 433.

Meanwhile, the synchronous detector 429 carries out synchronous detection of the output signal of the receiving amplifier 424 with the AC signal from the oscillator 421 and sends out a signal at a level according to a phase difference between them to the low-pass filter 430. The low-pass filter 430 has a cutoff frequency sufficiently lower than the frequency f0 and converts the output signal of the synchronous detector 429 to a DC signal and sends out the DC signal to the sample/hold circuit 431. The sample/hold circuit 431 holds a voltage value at a predetermined timing of the output signal of the low-pass filter 430 and sends out the voltage value to the analog to digital (A/D) conversion circuit 432. The A/D conversion circuit 432 converts the analog output of the sample/hold circuit 431 to a digital signal and outputs the digital signal to the processing control unit 433.

The processing control unit 433 controls the respective units of the position detecting device 400. Specifically, the processing control unit 433 controls selection of the loop coil in the selection circuit 413, switching by the switching connecting circuit 423, and the timing of the sample/hold circuits 427 and 431. The processing control unit 433 causes radio waves to be transmitted from the X-axis direction loop coil group 411 and the Y-axis direction loop coil group 412 with a certain transmission continuation time (continuous transmission section) on the basis of input signals from the A/D conversion circuits 428 and 432.

In each loop coil of the X-axis direction loop coil group 411 and the Y-axis direction loop coil group 412, an induced voltage is generated by radio waves transmitted from the position indicator 1. The processing control unit 433 calculates a coordinate value of the position indicated by the position indicator 1 in the X-axis direction and the Y-axis direction on the basis of the level of the voltage value of this induced voltage generated in each loop coil. Furthermore, the processing control unit 433 detects the writing pressure on the basis of the level of a signal according to the phase difference between transmitted radio waves and received radio waves.

In this manner, the position of the position indicator 1 that approaches is detected by the processing control unit 433 in the position detecting device 400. Furthermore, information on the writing pressure value of the position indicator 1 is obtained by detecting the phase of a received signal.

[Effects of Embodiment]

As described above, in the position indicator of the above-described first embodiment, the core body unit has the configuration in which, in the ferrite core 310 around which the coil is wound, the part around which the coil 311 is not wound is covered by the protective material 312 and the pen tip part 313 is formed. Thus, the ferrite core 310 can be easily set thin compared with the case in which a through-hole is opened in the ferrite core 310 and a core body is inserted therein and the case in which a protruding member serving as the pen tip part is joined to an end part of the ferrite core 310 like conventional configurations.

Furthermore, although there is a fear that the ferrite core 310 becomes susceptible to breakages when being set thin, the ferrite core 310 of the pen tip part 313 is covered by the protective material 312 to be reinforced and thus can be made less susceptible to breakages.

Moreover, in the position indicator cartridge 3 of the above-described embodiment, the pen tip part 313 of the core body unit 31 is formed by covering the ferrite core 310 with the protective material 312. Thus, the end part of the ferrite core 310 exists at a position reaching the tip end part of the pen tip part 313. Therefore, there is also an effect that the distance between the ferrite core 310 and the sensor of the position detecting device can be shortened and the electromagnetic coupling between both can be made stronger.

Furthermore, by making the tubular body unit 32 have a thin shape in addition to the core body unit 31, thickness reduction of the whole of the position indicator cartridge 3 is enabled. This can realize thickness reduction of the position indicator. In addition, it becomes possible to enable the position indicator cartridge 3 to have a configuration that allows ensuring of compatibility with a refill of a commercially-available ballpoint pen as in the above-described embodiment.

If the position indicator cartridge 3 has the configuration that allows ensuring of compatibility with a refill of a commercially-available ballpoint pen, there is a merit that the chassis of the commercially-available ballpoint pen can be diverted as the chassis 2 of the position indicator 1. That is, the position indicator 1 can be configured by housing the position indicator cartridge 3 of the present embodiment instead of a refill of the ballpoint pen in the chassis of the ballpoint pen.

[Second Embodiment]

A position indicator of a second embodiment is a modification example of the first embodiment. In the above-described first embodiment, only one position indicator cartridge is housed in the chassis. In the second embodiment, plural position indicator cartridges are housed in the chassis. Furthermore, one of the plural position indicator cartridges is selected by a knock cam mechanism and the tip of the pen tip part of the selected position indicator cartridge protrudes from an opening of the chassis on the pen tip side and is used.

As described above, the position indicator cartridge 3 of the position indicator 1 of the first embodiment has a configuration that ensures compatibility with the refill 6 of a ballpoint pen. As a commercially-available ballpoint pen, a multicolor ballpoint pen in which refills with different ink colors are mounted exists. The second embodiment provides a position indicator configured by housing the position indicator cartridges 3 in a chassis with a configuration similar to that of the chassis of this multicolor ballpoint pen.

Figure 4:
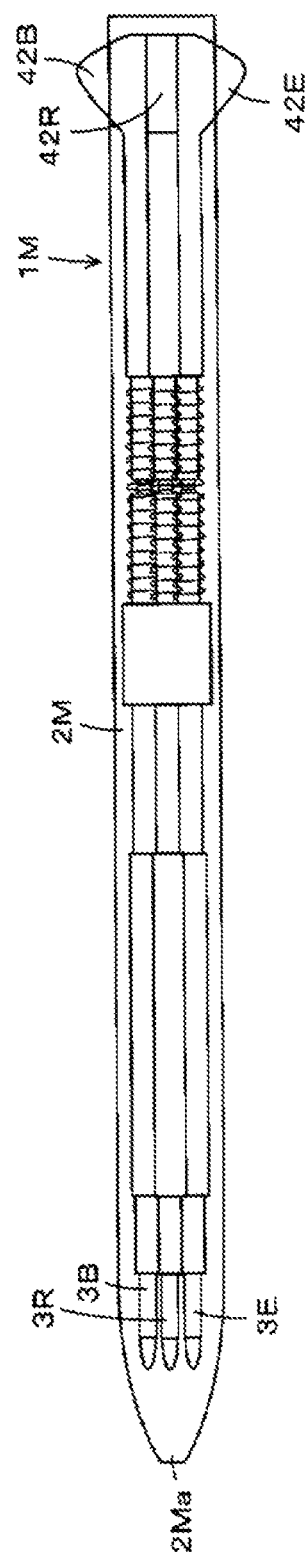
FIG. 4 is a diagram depicting a configuration example of a second embodiment of a position indicator according to the present disclosure.

FIG. 4 is a configuration diagram depicting the appearance of a position indicator 1M of the second embodiment. The example of FIG. 4 is also depicted in a state in which a chassis 2M of the position indicator 1M is composed of a transparent synthetic resin and the inside thereof is see-through.

The chassis 2M of the position indicator 1M has the same configuration as the chassis and knock cam mechanism of a commercially-available knock-type multicolor ballpoint pen. The chassis and knock cam mechanism of a commercially-available knock-type multicolor ballpoint pen may be used as they are. In this example, three position indicator cartridges 3B, 3R, and 3E are housed in the chassis 2M.

The position indicator cartridges 3B, 3R, and 3E are configured similarly to the position indicator cartridge 3 of the first embodiment in terms of the outer shape except for that the position indicator cartridges 3B, 3R, and 3E are formed with the same dimensions as refills of the multicolor ballpoint pen. However, in the position indicator cartridges 3B, 3R, and 3E of the case of the second embodiment, a first tubular body unit 321 in which electronic circuit components are disposed is provided with an integrated circuit (IC) and a peripheral circuit thereof for implementing a function of transmitting identification information of oneself to a position detecting device besides a capacitor Cf forming the above-described resonant circuit. The other configurations of the position indicator cartridges 3B, 3R, and 3E are set the same as the position indicator cartridge 3 of the first embodiment.

Furthermore, the knock cam mechanism of the position indicator 1M is provided with knock bars 42B, 42R, and 42E corresponding to each of joint parts to which a respective one of the position indicator cartridges 3B, 3R, and 3E are fitted. Moreover, any of the knock bars 42B, 42R, and 42E is moved by sliding to the pen tip side. Thereby, the tip of the pen tip part 313 of any of the position indicator cartridges 3B, 3R, and 3E protrudes to be coupled to a sensor of a position detecting device by electromagnetic induction.

Furthermore, in the case of the present embodiment, the position detecting device used with the position indicator cartridges 3B, 3R, and 3E has a function of receiving and discriminating identification information transmitted from each of the position indicator cartridges 3B, 3R, and 3E. Specifically, the position detecting device of the case of the present embodiment discriminates the difference among the position indicator cartridges 3B, 3R, and 3E and implements the functions assigned to a respective one of the position indicator cartridges 3B, 3R, and 3E.

In an example to be described below, for example, to the position indicator cartridge 3B, a function of representing a locus (character or graphic) displayed according to the indicated position thereof by black is assigned. To the position indicator cartridge 3R, a function of representing a locus displayed according to the indicated position thereof by red is assigned. To the position indicator cartridge 3E, a function of erasing a locus indicated and input previously according to the indicated position thereof is assigned. The function assigned to the position indicator cartridge may be not only the display color of the locus according to the indicated position as in this example but the thickness of the locus, the type of line displayed, such as a solid line, a dotted line, or a one-dot chain line, and so forth.

Figure 5:
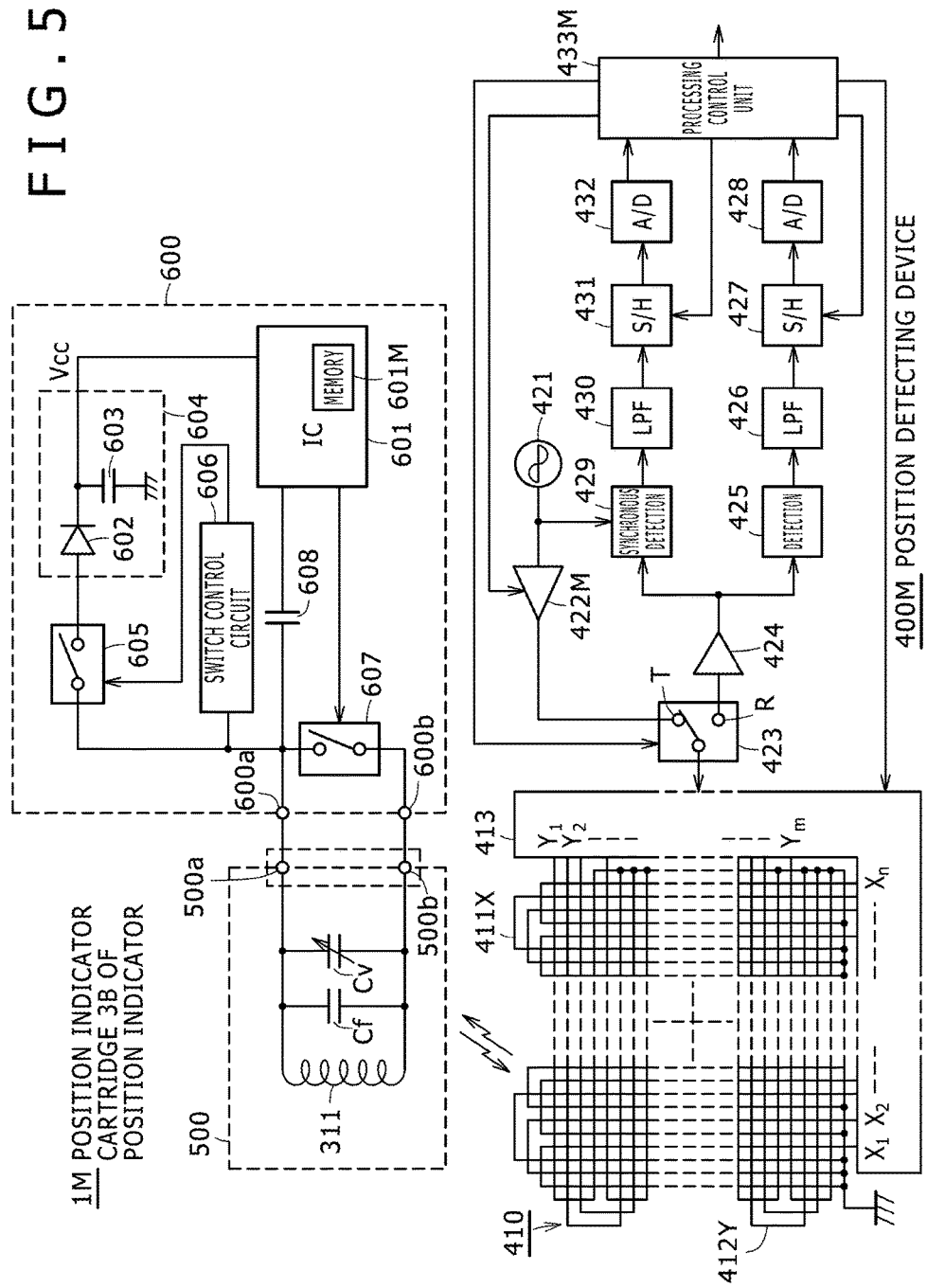
FIG. 5 is a diagram depicting a circuit configuration of the second embodiment of the position indicator according to the present disclosure with a circuit configuration of a position detecting device used with this position indicator.

FIG. 5 is a diagram depicting circuit configurations of the position indicator 1M in the case in which a configuration is so made that the identification information (hereinafter, referred to as identification (ID) signal) of the position indicator cartridges 3B, 3R, and 3E is transmitted to a position detecting device 400M used with the position indicator 1M, and the position detecting device 400M. In FIG. 5, the circuit configuration of the position indicator 1M is depicted by employing one of the position indicator cartridges 3B, 3R, and 3E as the representative. It goes without saying that the other position indicator cartridges 3R and 3E have the same circuit configuration and carry out the same operation.

In the following description, the case will be described in which, in the position indicator 1M, the tip of the pen tip part 313 of the position indicator cartridge 3B protrudes from an opening 2Ma of the chassis 2M to outside of the chassis 2M through a sliding movement of the knock bar 42B and is coupled to the position detecting device 400M by electromagnetic induction. In the following description, regarding the same constituent part as the position indicator cartridge 3 of the first embodiment in the position indicator cartridge 3B, the same reference symbol s are used. In addition, regarding the same constituent part as the position detecting device 400 of the first embodiment in the position detecting device 400M, the same reference symbols are used.

The position indicator cartridge 3B includes a parallel resonant circuit 500 in which the capacitor Cf provided in the first tubular body unit 321 of a tubular body unit 32 and a variable-capacitance capacitor Cv of a writing pressure detector 36 are connected in parallel to a coil 311 as with the position indicator cartridge 3 of the first embodiment, and an ID transmitting circuit 600.

Terminals 500a and 500b connected to one end and the other end of the coil 311 of the parallel resonant circuit 500 are connected to two terminals 600a and 600b, respectively, of the ID transmitting circuit 600.

As depicted in FIG. 5, the ID transmitting circuit 600 includes an integrated circuit (IC) 601 as an ID generation control circuit. The IC 601 is configured to operate by a power supply Vcc obtained by rectifying an AC signal received in the parallel resonant circuit 500 from the position detecting device 400M by electromagnetic induction coupling in a rectifying circuit (power supply circuit) 604 composed of a diode 602 and a capacitor 603. Furthermore, in this example, a switch circuit 605 set to an open state normally (normal open) is provided between the terminal 600a and the power supply circuit 604. This switch circuit 605 is formed of a semiconductor switch circuit, for example, and is in a high-impedance state in the open state.

The switch circuit 605 is controlled to be turned on by a switch control signal from a switch control circuit 606. The switch control circuit 606 generates the switch control signal from an AC signal received in the parallel resonant circuit 500 from the position detecting device 400M by electromagnetic induction coupling.

Furthermore, in the ID transmitting circuit 600, a switch circuit 607 is connected in parallel to the parallel resonant circuit 500. This switch circuit 607 is configured to be on/off-controlled by the IC 601.

In this example, the IC 601 stores, in a built-in memory 601M, an ID signal formed of a digital signal of, e.g., eight bits including information on a manufacturer number of the position indicator cartridge 3B, a product number, a kind of function like the above-described ones, and so forth. Furthermore, the IC 601 carries out on/off-control of the switch circuit 607 by the ID signal stored in the memory 601M. Thereby, the IC 601 intermittently interrupts the AC signal received from the position detecting device 400M and generates an amplitude shift keying (ASK) signal to transmit the above-described ID signal to the position detecting device 400M.

On the other hand, the position detecting device 400M of the example of FIG. 5 has a configuration obtained by, in the configuration of the position detecting device 400 depicted in FIG. 3, providing a current driver 422M whose gain can be varied and adjusted by a gain control signal from the external instead of the current driver 422 whose gain is fixed and providing a processing control unit 433M instead of the processing control unit 433. The other respective units are exactly the same as the position detecting device 400 depicted in FIG. 3.

The current driver 422M is configured to receive the gain control signal from the processing control unit 433M and is capable of changing the signal level of a transmission signal.

Furthermore, the processing control unit 433M is formed of a microcomputer, for example, and carries out detection of the position indicted by the position indicator 1M and detection of the writing pressure applied to the position indicator 1M through transmission and reception of electromagnetic induction signals with the position indicator 1M as with the above-described processing control unit 433. In addition, the processing control unit 433M supplies, to the current driver 422M, a signal for intermittent-interruption control of a transmission signal and a signal for control of the transmission signal level, and executes reception processing of the ID signal from the position indicator 1M. As described later, the processing control unit 433M detects an intermittent signal from the position indicator 1M as a digital signal of several bits, e.g., eight bits, and detects the ID signal.

In the following, transmission and reception of the ID signal, a position detection operation, and a writing pressure detection operation will be described by taking as an example the case in which electromagnetic induction coupling is established between the position indicator cartridge 3B of the position indicator 1M and the position detecting device 400M.

In the position indicator cartridge 3B, the IC 601 stops operation in a state in which the switch circuit 605 is in an off-state and the supply voltage Vcc is not being provided from the power supply circuit 604. At this time, when being seen from the side of the parallel resonant circuit 500, the ID transmitting circuit 600 is in the high-impedance state, which is equivalent to a state in which nothing is connected to the parallel resonant circuit 500. Therefore, at this time, the resonant frequency of the parallel resonant circuit 500 is not affected by the ID transmitting circuit 600. To the IC 601, an electromagnetic induction signal transmitted from the position detecting device 400M via a capacitor 608 is supplied as a synchronization signal for exchange of electromagnetic induction signals with the position detecting device 400M.

Figure 6:
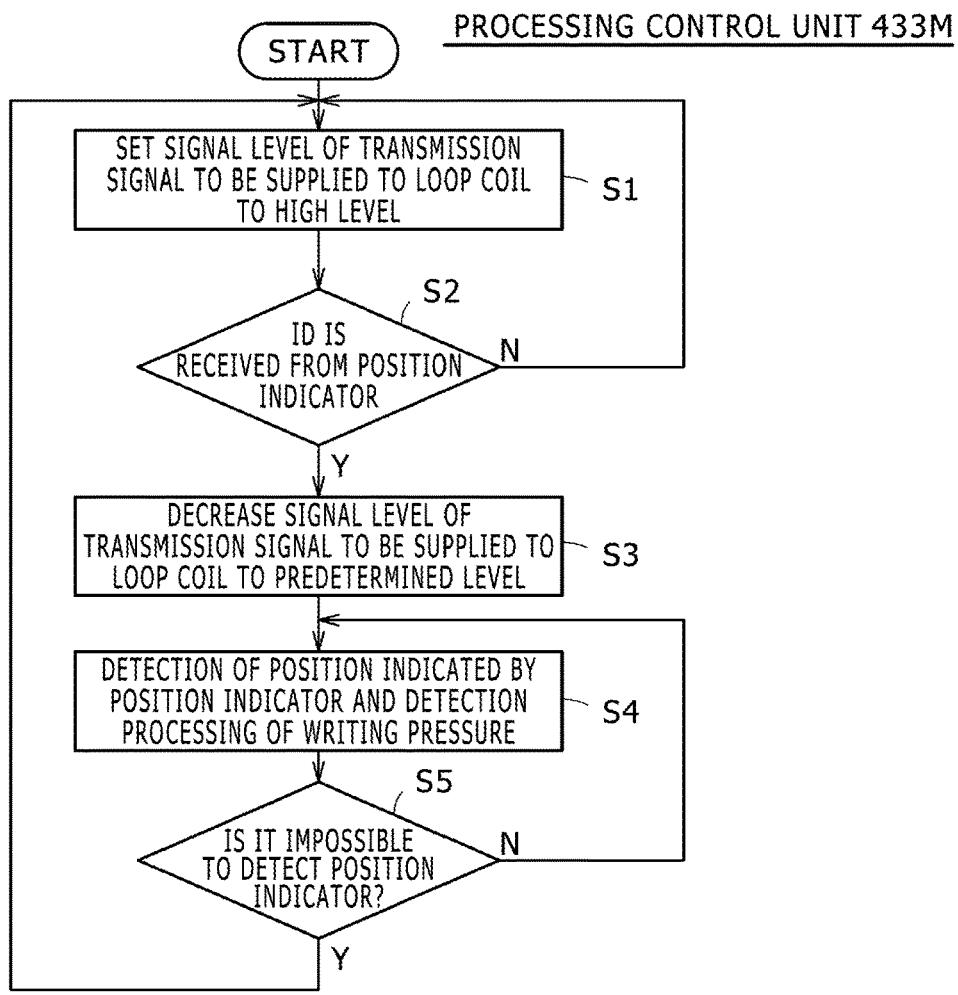
FIG. 6 is a diagram depicting a flowchart representing a processing operation example in the position detecting device that uses the position indicator of the second embodiment.

FIG. 6 is a flowchart for explaining processing operation of the processing control unit 433M of the position detecting device 400M. When the position detecting device 400M is in a power-on state, the processing of this FIG. 6 is repeatedly executed.

Specifically, first, the processing control unit 433M supplies the gain control signal that sets the signal level of the transmission signal high to the current driver 422M. Thereby, an AC signal with a frequency f0 from an oscillator 421 is set to the high level by the current driver 422M and is supplied to loop coil groups 411X and 412Y via a selection circuit 413 (step S1).

In the position indicator cartridge 3B of the position indicator 1M, an electromagnetic induction signal based on the high-level AC signal from the position detecting device 400M is received by the parallel resonant circuit 500. At this time, corresponding to the signal level of the AC signal from the position detecting device 400M being high, the switch control circuit 606 generates a switch control signal that turns on the switch circuit 605 from the AC signal received by the parallel resonant circuit 500. When the switch circuit 605 is turned on due to this, the supply voltage Vcc generated by rectifying the AC signal received by the parallel resonant circuit 500 is provided from the power supply circuit 604 to the IC 601.

When the supply voltage Vcc is provided to the IC 601, the IC 601 starts operation. The IC 601 generates the ID signal of the position indicator cartridge 3B as a digital signal and carries out on/off-control of the switch circuit 607 to carry out on/off-control of the parallel resonant circuit 500 due to the digital signal. Thereby, from the position indicator cartridge 3B, an electromagnetic induction signal obtained by intermittently interrupting the AC signal from the position detecting device 400M based on the ID signal to turn the AC signal to an ASK signal is transmitted from the position indicator cartridge 3B of the position indicator 1M to the position detecting device 400M.

Specifically, for example, when a bit of the ID signal is "0" and the switch circuit 607 is in the off-state, the parallel resonant circuit 500 can carry out resonance operation for the AC signal transmitted from the position detecting device 400M and return the electromagnetic induction signal to the position detecting device 400M. The loop coils of the position detecting device 400M receive the electromagnetic induction signal from the parallel resonant circuit 500 of the position indicator cartridge 3B of the position indicator 1M. In contrast, when a bit of the ID signal is "1" and the switch circuit 607 is in the on-state, the parallel resonant circuit 500 becomes in a state in which the resonance operation for the AC signal from the position detecting device 400M is prohibited. Thus, the electromagnetic induction signal is not returned from the parallel resonant circuit 500 to the position detecting device 400M and the loop coils of the position detecting device 400M do not receive a signal from the position indicator cartridge 3B of the position indicator 1M.

In this example, the processing control unit 433M of the position detecting device 400M carries out detection of whether or not the received signal from the position indicator cartridge 3B of the position indicator 1M is present eight times and thereby receives the digital signal of eight bits. That is, in the step S1, the processing control unit 433M carries out gain control of the current driver 422M and makes a state in which the signal level of the transmission signal is set high and the transmission signal is sent out. In addition, the processing control unit 433M carries out transmission and reception eight times continuously at timings similar to those in coordinate detection in order to detect the ID signal of eight bits from the position indicator cartridge 3B of the position indicator 1M.

Furthermore, the processing control unit 433M of the position detecting device 400M can receive the ID signal that is a digital signal of eight bits by carrying out detection of whether or not the received signal from the position indicator cartridge 3B of the position indicator 1M is present eight times.

By executing the above-described processing, the processing control unit 433M of the position detecting device 400M determines whether or not the ID signal from the position indicator cartridge 3B of the position indicator 1M has been received (step S2). When determining that the ID signal could not be received in a predetermined time, the processing control unit 433M returns to the step S1 and carries out transmission of the transmission signal at the high level a predetermined number of times continuously. Instead of the transmission signal at the high level, a burst signal at a predetermined level with a long signal continuation period may be employed as the transmission signal.

When the ID signal cannot be received although the reception processing of the ID signal is executed a predetermined number of times continuously, the processing control unit 433M determines that the position indicator 1M does not have the function of sending out the ID signal, and skips the reception processing of the ID signal.

Furthermore, when determining that the ID signal has been received in the step S2, the processing control unit 433M decreases the gain of the current driver 422M to decrease the signal level of the transmission signal from the high level in the step S1 to a predetermined level (normal use level) (step S3). The predetermined level at this time is set to a level at which detection of the position indicated by the position indicator cartridge 3B of the position indicator 1M and detection of the writing pressure are possible in the position detecting device 400M but the switch control circuit 606 of the position indicator cartridge 3B of the position indicator 1M cannot turn on the switch circuit 605.

When the signal level of the electromagnetic induction signal transmitted from the position detecting device 400M is set to the predetermined level (normal use state) in this manner, the switch control circuit 606 of the position indicator cartridge 3B of the position indicator 1M does not output the switch control signal that turns on the switch circuit 605. For this reason, the provision of the supply voltage Vcc from the power supply circuit 604 to the IC 601 stops and the IC 601 becomes inoperative. Thus, the processing of the flowchart of FIG. 6 ends and the position indicator cartridge 3B of the position indicator 1M stops the transmission of the ID signal.

However, the state in which the signal level of the electromagnetic induction signal transmitted from the position detecting device 400M is set to the predetermined level (normal use state) is exactly the same state as the case of FIG. 3. Thus, the processing control unit 433M of the position detecting device 400M executes processing of detecting the position indicated by the position indicator cartridge 3B of the position indicator 1M and the writing pressure as explained in the above-described first embodiment by transmission and reception of electromagnetic induction signals with the parallel resonant circuit 500 of the position indicator cartridge 3B of the position indicator 1M (step S4).

Then, the processing control unit 433M monitors the return of the electromagnetic induction signal from the parallel resonant circuit 500 of the position indicator cartridge 3B of the position indicator 1M and determines whether or not the present state has become the state in which the position indicator cartridge 3B of the position indicator 1M cannot be detected due to the disappearance of the return of this electromagnetic induction signal (step S5). When determining that the detection of the position indicator cartridge 3B of the position indicator 1M is possible in the step S5, the processing control unit 433M returns the processing to the step S4. Furthermore, when determining that the detection of the position indicator cartridge 3B of the position indicator 1M has become impossible in the step S5, the processing control unit 433M returns the processing to the step S1 and sets the signal level of the transmission signal to be supplied to the loop coil groups 411X and 412Y to the high level by supplying the gain control signal that sets the signal level of the transmission signal to the high level to the current driver 422M. Then, the processing control unit 433M repeats the processing of the step S1 and the subsequent steps.

[Effects of Second Embodiment]

According to the above-described second embodiment, the position indicator can house plural position indicator cartridges and each of the position indicator cartridges can transmit its own ID signal to the position detecting device. Furthermore, in the position detecting device used with the position indicator of the second embodiment, the ID signal of the position indicator cartridge is detected. This makes it possible to discriminate the predetermined functional processing assigned to a respective one of the position indicator cartridges, which is very convenient. Moreover, according to the position indicator of the second embodiment, there is a merit that, by selectively using the plural position indicator cartridges, various functions can be implemented without selecting the function on the position detecting device side.

Furthermore, in the position indicator of the above-described second embodiment, the chassis and the knock cam mechanism have a configuration similar to that of a commercially-available multicolor ballpoint pen. Thus, refills of the ballpoint pen can be replaced by the position indicator cartridges and the position indicator cartridges can be housed in the chassis of the position indicator and be used. This allows the position indicator of the second embodiment to have both the function as the ballpoint pen as a writing instrument and the function of the electronic pen used with the position detecting device.

[Modification Examples of Second Embodiment]

In the above-described example, when the electromagnetic induction signal at the high level from the position detecting device 400M is received by the parallel resonant circuit 500, the switch control circuit 606 of the position indicator cartridges 3B, 3R, and 3E generates the switch control signal that turns on the switch circuit 605 based on the received electromagnetic induction signal at the high level and thereby provides the power supply Vcc to the IC 601.

However, the method for turning on the switch circuit 605 by the switch control circuit 606 to provide the power supply Vcc to the IC 601 is not limited to such a method. For example, as another example, it is also possible to employ a configuration in which a predetermined digital signal is sent from the position detecting device 400M to the position indicator cartridge 3B, 3R, or 3E and the switch control circuit 606 of the position indicator cartridge 3B, 3R, or 3E that has received this digital signal is made to generate the switch control signal that turns on the switch circuit 605.

[Another Embodiment of Position Indicator Cartridge]

In the core body unit 31 of the position indicator cartridges 3, 3B, 3R, and 3E in the position indicators 1 and 1M of the above-described first embodiment and second embodiment, only the part around which the coil 311 is not wound in the ferrite core 310 is covered by the protective material 312. However, as depicted in FIG. 7, the protective material 312 may also cover the part where the coil 311 is wound around the ferrite core 310.

This provides an effect that the ferrite core 310 formed into a thin shape can be protected by the protective material 312 more strongly.

Figure 7:
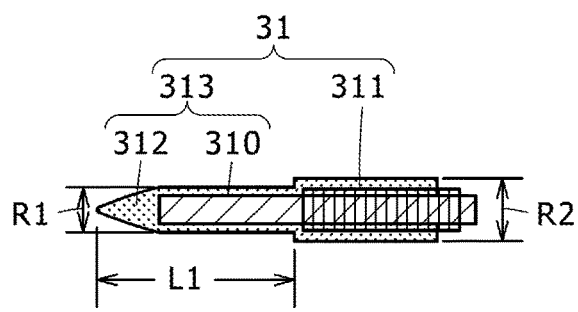
FIG. 7 is a diagram for explaining a configuration example of a major part of another embodiment of a position indicator cartridge according to the present disclosure.
Figure 8:
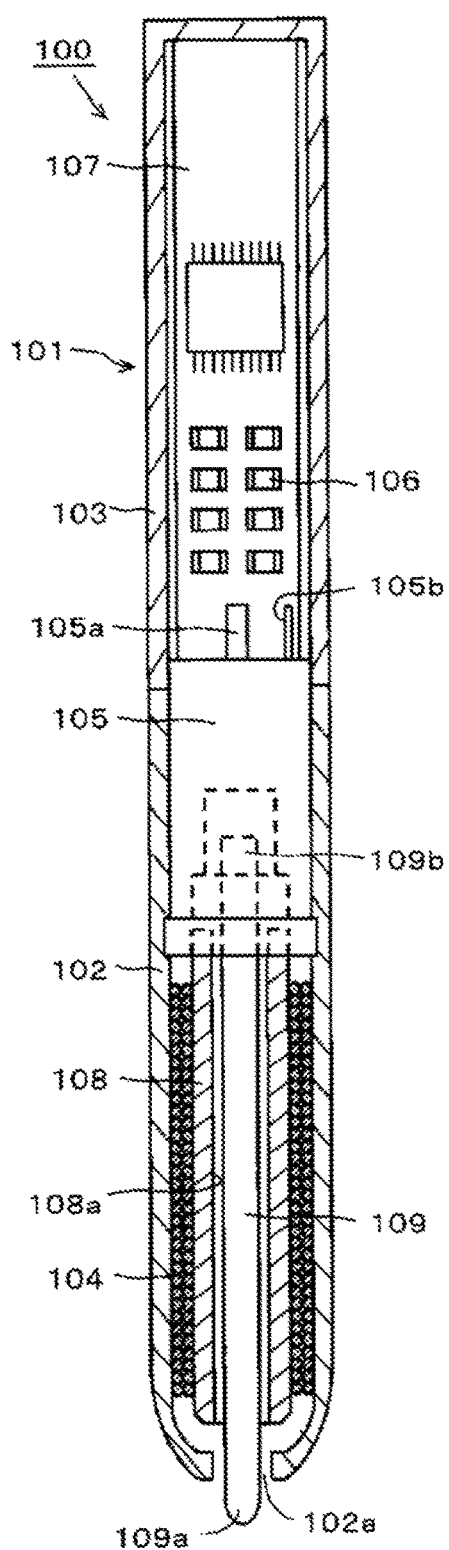
FIG. 8 is a diagram for explaining one example of a conventional position indicator.
Figure 9A:
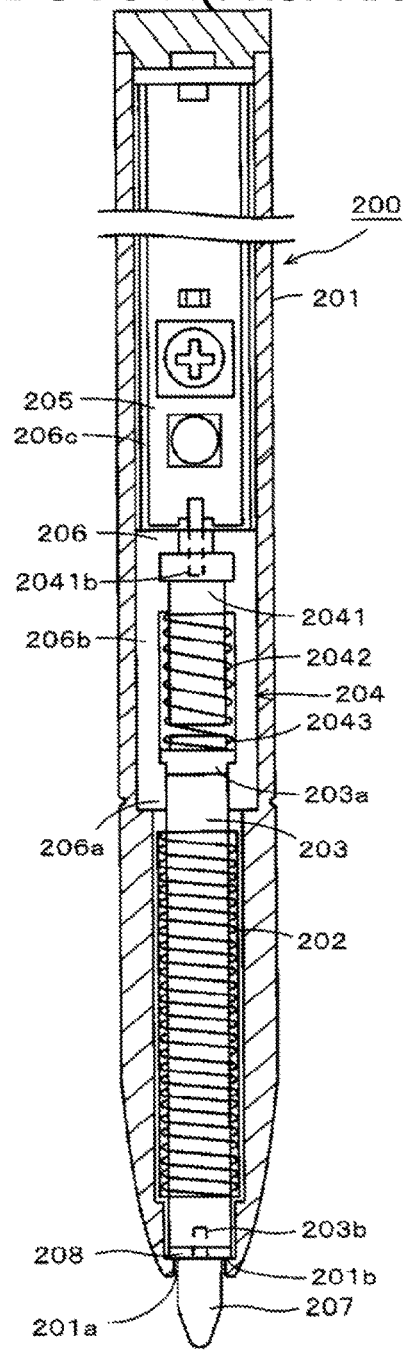
FIGS. 9A-9C are diagrams for explaining another example of a conventional position indicator.
Figure 9B:
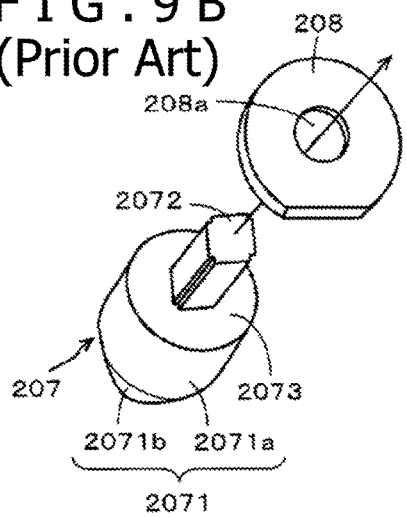
Figure 9C:
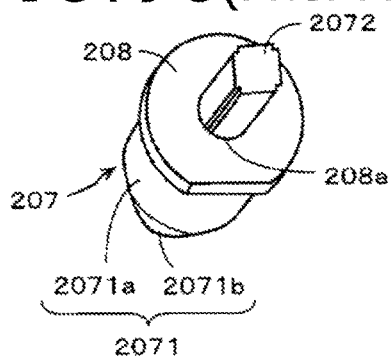

Also in this case, in the case of keeping the compatibility with the refill of a commercially-available ballpoint pen, as depicted in FIG. 7, the diameter of the pen tip part 313 is set substantially identical to the diameter R1 of the pen tip of the commercially-available ballpoint pen and the diameter of the part around which the coil 311 is wound, protected by the protective material 312, is set to be substantially identical to the diameter R2 of the ink storage of the commercially-available ballpoint pen.

[Other Embodiments or Modification Examples]

In the above-described embodiments, as the writing pressure detector, the variable-capacitance capacitor that varies its capacitance according to the writing pressure is used. However, it goes without saying that the writing pressure detector may be an element that varies its inductance value or resistance value as long as it is a change circuit that changes the resonant frequency of the resonant circuit.

Furthermore, in the above-described embodiments, the writing pressure detector is provided in the position indicator cartridge. However, the configuration may be so made that a switch turned on according to the pressure applied to the position indicator cartridge is provided instead of the writing pressure detector and the resonant circuit operates when this switch is turned on. Furthermore, the configuration may be so made that a threshold is set about the pressure detected by the writing pressure detector and the resonant circuit operates when the pressure detected by the writing pressure detector surpasses the threshold.

Moreover, in the above-described embodiments, the tip part of the core body is monolithically formed by the protective material that covers the ferrite core. However, the protective material and the tip part of the core body may be separate bodies and both may be joined.

In addition, in the above-described first embodiment and second embodiment, the position indicator cartridges are given the same dimensions as the refill of a commercially-available ballpoint pen so that compatibility between the chassis of the position indicators 1 and 1M and the chassis of the commercially-available ballpoint pen can be achieved. However, it is obvious that the position indicator cartridge formed into a thin shape can be configured without considering the compatibility with the refill of the commercially-available ballpoint pen.

Furthermore, in the above-described first embodiment, the configuration is so made that the position indicator cartridge protrudes from and retracts in the chassis based on a knock system by using the knock cam mechanism. However, the position indicator is not limited to such a knock-type one, and may be a position indicator of a form in which simply the position indicator cartridge is housed in the chassis.

Moreover, in the above-described second embodiment, the position indicator 1M has the configuration made in consideration of the compatibility with a commercially-available knock-type multicolor ballpoint pen regarding not only the position indicator cartridges but also the chassis and the knock cam mechanism. However, the compatibility with a commercially-available knock-type multicolor ballpoint pen is not an essential requirement of the present disclosure as with the first embodiment.

In the above-described embodiments, the resonant circuit composed of the coil wound around the ferrite core and the capacitors is used as a resonant circuit for returning a signal to the position detecting device after an AC signal from the position detecting device is received. However, the present disclosure can be applied also to the case in which the resonant circuit composed of the coil wound around the ferrite core and the capacitors is used for the purpose of not returning the AC signal from the position detecting device but only use for generating a supply voltage. For example, the present disclosure can be applied also to a position indicator that is a position indicator of the capacitive system and generates a supply voltage by using a resonant circuit composed of a coil wound around a ferrite core and a capacitor.

DESCRIPTION OF REFERENCE SYMBOLS 1, 1M . . . Position indicator,
2, 2M . . . Chassis,
3, 3B, 3R, 3E . . . Position indicator cartridge,
4 . . . Knock cam mechanism,
6 . . . Refill of commercially-available ballpoint pen,
31 . . . Core body unit,
32 . . . Tubular body unit,
33 . . . Printed board,
36 . . . Writing pressure detector,
310 . . . Ferrite core,
311 . . . Coil,
312 . . . Resin,
313 . . . Pen tip part

The invention claimed is:

1. A position indicator having a tubular chassis in which an opening is made on one end in an axial direction as a pen tip side and another end is closed, the position indicator comprising:
 at least one position indicator cartridge housed in the tubular chassis, each position indicator cartridge including:
  a core body unit including a coil that is wound partly around a bar-shaped magnetic core, part of the magnetic core around which the coil is not wound forming a pen tip part, and
  a tubular body unit that houses at least a capacitor that forms a resonant circuit with the coil,
  the core body unit and the tubular body unit being joined and fixed in the axial direction on a side opposite to the pen tip part of the core body unit in a state in which the coil and the pen tip part of the core body unit are exposed and in a state in which the coil and the capacitor are electrically connected,
  the tubular body unit being divided into a pen tip side and a side opposite to the pen tip side in the axial direction, and the pen tip side and the side opposite to the pen tip side in the divided tubular body unit being joined to each other in a state in which they are separated from each other and elastically displaceable in the axial direction, and
  a change circuit configured to change a resonant frequency or a phase of the resonant circuit according to a writing pressure applied to the core body unit being provided in one of the pen tip side and the side opposite to the pen tip side in the tubular body unit, the change circuit forming part of the resonant circuit.

2. The position indicator according to claim 1, wherein the position indicator cartridge is part of an electromagnetic induction system that returns a predetermined alternating current signal from a sensor of a position detecting device to the sensor of the position detecting device through the resonant circuit.

3. The position indicator according to claim 1, wherein the pen tip part of the core body unit of the position indicator cartridge is covered by a protective material.

4. The position indicator according to claim 3, wherein the protective material also covers at least part of the magnetic core around which the coil is wound.

5. The position indicator according to claim 1, wherein a diameter of the core body unit of the position indicator cartridge is substantially identical to a diameter of a pen tip part of a refill of a ballpoint pen and a diameter of the tubular body unit of the position indicator cartridge is substantially identical to a diameter of an ink storage of the refill of the ballpoint pen, and a length of the position indicator cartridge is substantially identical to a length of the refill of the ballpoint pen.

6. The position indicator according to claim 5, wherein the chassis houses the refill of the ballpoint pen and the position indicator functions as the ballpoint pen.

7. The position indicator according to claim 1, further comprising:
a mechanism of a knock-type ballpoint pen that is configured to cause the pen tip part of the core body unit of the position indicator cartridge to protrude and retract from the opening of the chassis, and that is provided in the chassis.

8. The position indicator according to claim 1, wherein the at least one position indicator cartridge includes a plurality of the position indicator cartridges, and the position indicator further comprises a mechanism of a knock-type multicolor ballpoint pen that is configured to cause a pen tip side of the core body unit of one of the plurality of the position indicator cartridges to selective protrude from the opening to outside of the chassis.

9. The position indicator according to claim 8, wherein a diameter of the core body unit of the position indicator cartridges is substantially identical to a diameter of a pen tip part of a refill of a ballpoint pen and a diameter of the tubular body unit is substantially identical to a diameter of an ink storage of the refill of the ballpoint pen, and a length of the position indicator cartridges is set substantially identical to a length of the refill of the ballpoint pen.

10. The position indicator according to claim 9, wherein the chassis houses the refill of the ballpoint pen instead of one or more of the plurality of the position indicator cartridges, and the position indicator functions also as a knock-type multicolor ballpoint pen.

11. The position indicator according to claim 2, further comprising:
a control circuit that is configured to store identification information of the position indicator cartridge and transmit the stored identification information to the position detecting device by controlling operation of the resonant circuit, and that is provided in the tubular body unit of the at least one position indicator cartridge.

12. The position indicator according to claim 2, further comprising:
a circuit that is configured to rectify the alternating current signal from the sensor of the position detecting device and generate a supply voltage of the control circuit, and that is provided in the tubular body unit of the at least one position indicator cartridge.

13. A position indicator cartridge comprising:
a core body unit including a coil that is wound partly around a bar-shaped magnetic core, at least part of the magnetic core around which the coil is not wound forming a pen tip part, and
a tubular body unit that houses at least a capacitor that forms a resonant circuit with the coil,
the core body unit and the tubular body unit being joined and fixed in an axial direction of the tubular body unit on a side opposite to the pen tip part of the core body unit in a state in which the coil and the pen tip part of the core body unit are exposed and in a state in which the coil and the capacitor are electrically connected to form the resonant circuit,
the tubular body unit being divided into a pen tip side and a side opposite to the pen tip side in the axial direction, and the pen tip side and the side opposite to the pen tip side in the divided tubular body unit being joined to each other in a state in which they are separated from each other and elastically displaceable in the axial direction, and
a change circuit configured to change a resonant frequency or a phase of the resonant circuit according to a writing pressure applied to the core body unit being provided in one of the pen tip side and the side opposite to the pen tip side in the tubular body unit, the change circuit forming part of the resonant circuit.

14. The position indicator cartridge according to claim 13, wherein
the position indicator cartridge is part of an electromagnetic induction system that returns a predetermined alternating current signal from a sensor of a position detecting device to the sensor of the position detecting device through the resonant circuit.

15. The position indicator cartridge according to claim 13, wherein
the pen tip part of the core body unit is covered by a protective material.

16. The position indicator cartridge according to claim 15, wherein
the protective material also covers at least part of the magnetic core around which the coil is wound.

17. The position indicator cartridge according to claim 13, wherein
a diameter of the core body unit is substantially identical to a diameter of a pen tip part of a refill of a ballpoint pen and a diameter of the tubular body unit is substantially identical to a diameter of an ink storage of the refill of the ballpoint pen, and a length is substantially identical to a length of the refill of the ballpoint pen.

18. The position indicator cartridge according to claim 13, further comprising:
a control circuit that is configured to store identification information of the position indicator cartridge and transmit the stored identification information to the position detecting device by controlling operation of the resonant circuit, and that is provided in the tubular body unit.

19. The position indicator cartridge according to claim 13, further comprising:
a circuit that is configured to rectify an alternating current signal from a sensor of the position detecting device and generate a supply voltage of the control circuit, and that is provided in the tubular body unit.

20. The position indicator cartridge according to claim 13, further comprising:
- a coil spring disposed between the pen tip side and the side opposite to the pen tip side of the tubular body unit, the coil spring elastically displacing at least one of the pen tip side and the side opposite to the pen tip side such that the pen tip side and the side opposite to the pen tip side are separated from each other in the axial direction; and
- a linking bar member at least partially disposed within the coil spring, one end of the linking bar member configured to press part of the change circuit.

21. The position indicator according to claim 1, further comprising:
- a coil spring disposed between the pen tip side and the side opposite to the pen tip side of the tubular body unit, the coil spring elastically displacing at least one of the pen tip side and the side opposite to the pen tip side such that the pen tip side and the side opposite to the pen tip side are separated from each other in the axial direction; and
- a linking bar member at least partially disposed within the coil spring, one end of the linking bar member configured to press part of the change circuit.

* * * * *